(12) United States Patent
Kawano (10) Patent No.: US 8,357,343 B2
(45) Date of Patent: Jan. 22, 2013

(54) STAR-SHAPED ZINC OXIDE PARTICLES AND METHOD FOR PRODUCING THE SAME

(75) Inventor: Tetsuo Kawano, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 330 days.

(21) Appl. No.: 12/695,740

(22) Filed: Jan. 28, 2010

(65) Prior Publication Data

US 2010/0196712 A1    Aug. 5, 2010

(30) Foreign Application Priority Data

Jan. 30, 2009 (JP) ................. 2009-020933

(51) Int. Cl.
*C01G 9/00* (2006.01)
(52) U.S. Cl. ............................. 423/99; 423/622
(58) Field of Classification Search ............ 423/99, 423/622
See application file for complete search history.

(56) References Cited

FOREIGN PATENT DOCUMENTS

| JP | 4030133 B2 | 1/2008 |
| WO | 99/25654 A1 | 5/1999 |
| WO | 2008/133978 | * 11/2008 |

OTHER PUBLICATIONS

A. Oliveira et al., "Controlled Precipitation of Zinc Oxide Particles at Room Temperature", Chem. Mater. 2003, pp. 3202-3207, vol. 15, No. 16, published on web Jul. 18, 2003.

* cited by examiner

*Primary Examiner* — Steven Bos
(74) *Attorney, Agent, or Firm* — Sughrue Mion, PLLC (57) ABSTRACT

A method for producing star-shaped zinc oxide particles, the method including heating a solution containing tetrahydroxozincate(II) ion $[Zn(OH)_4]^{2-}$, and diluting the solution containing tetrahydroxozincate(II) ion $[Zn(OH)_4]^{2-}$ with a solvent in the course of reaction so that the concentration of zinc ion ($Zn^{2+}$) after the dilution is adjusted to 0.008 M or lower.

6 Claims, 5 Drawing Sheets

STAR-SHAPED ZINC OXIDE PARTICLES AND METHOD FOR PRODUCING THE SAME

BACKGROUND OF THE INVENTION

1. Field of the Invention

The present invention relates to star-shaped zinc oxide particles excellent in ultraviolet-ray absorbability, and to a method for efficiently producing the star-shaped zinc oxide particles through a simple process without any specific apparatus.

2. Description of the Related Art

Zinc oxide particles are used in various applications such as white pigments, ultraviolet-ray shielding agents, fillers, adsorbents, photocatalysts, catalysts, ceramics raw materials, conductive agents, piezoelectric materials, gas sensors, electrophotographic photosensitive materials, varistors, phosphors, emitters and electronic devices. In addition, they are used in, for example, cosmetics, external preparations and resin compositions. In particular, zinc oxide particles are widely used as an ultraviolet-ray shielding agent contained in sunscreen cosmetics, since they are excellent in ability to shield rays of the ultraviolet A (UVA) region (wavelength: 320 nm to 380 nm) and in transparency with respect to visible light.

As to such zinc oxide particles (their production method), for example, flower-shaped (carnation-shaped) zinc oxide aggregates in which primary particles having an average particle diameter of 50 nm to 100 nm are planarily assembled are proposed in Japanese Patent (JP-B) No. 4030133 and "INDUSTRIAL MATERIAL, 53 (2) 60-63 (2005)." However, such zinc oxide aggregates that have been proposed above are particles' aggregates each of which does not possess a structure in which the particles are accumulated and grown in a branched manner, the particles being accumulated so that crystallographic orientations thereof are aligned in a same direction. Also, production of the flower-shaped (carnation-shaped) zinc oxide aggregates requires a Double-Jet reaction apparatus. This is because they are produced by firing basic zinc carbonate in an aqueous reaction solution which is formed as follows. Specifically, an aqueous reaction solution of zinc ion ($Zn^{2+}$), carbonate ion ($CO_3^{2-}$) and hydroxide ion ($OH^-$) in water (reaction solvent) is allowed to react while the pH of the aqueous reaction solution is being maintained to be 7 to 9 and the mole ratio of the hydroxide ion to the carbonate ion (1) is being adjusted to 2.5 to 3.5. In addition, "Chem. Mater. 15 (16) 3202-3207 (2003)" describes that star-shaped zinc oxide particles are produced by accumulating nano-sized crystallites having a size of 16 nm to 33 nm so that their crystallographic orientations are aligned in a same direction. But, according to the method described in this literature, a complicated process must be performed using a Double-Jet reaction apparatus in order to produce star-shaped zinc oxide particles.

BRIEF SUMMARY OF THE INVENTION

An object of the present invention is to provide star-shaped zinc oxide particles having a highly uniform light-scattering intensity distribution in all directions of the particles and an excellent ultraviolet ray-shielding effect. Another object of the present invention is to provide a method for efficiently producing star-shaped zinc oxide particles in a simple process without any specific apparatus such as a Double-Jet reaction apparatus.

Means for solving the above existing problems are as follows.

<1> A method for producing star-shaped zinc oxide particles, the method including:
heating a solution containing tetrahydroxozincate(II) ion $[Zn(OH)_4]^{2-}$, and
diluting the solution containing tetrahydroxozincate(II) ion $[Zn(OH)_4]^{2-}$ with a solvent in the course of reaction so that the concentration of zinc ion ($Zn^{2+}$) after the dilution is adjusted to 0.008 M or lower.

<2> The method according to <1> above, wherein the diluting is carried out so that the concentration of zinc ion ($Zn^{2+}$) after the dilution is adjusted to 0.005 M or lower.

<3> The method according to <1> above, wherein the solution containing tetrahydroxozincate(II) ion $[Zn(OH)_4]^{2-}$ contains zinc ion ($Zn^{2+}$) and hydroxide ion ($OH^-$) and has a pH of 12.5 to 14.0.

<4> The method according to <1> above, wherein the solution obtained after completion of the reaction has a pH of 11 to 13.

<5> The method according to <1> above, wherein the heating is carried out at a temperature of 40° C. or higher.

<6> The method according to <1> above, wherein the solution containing tetrahydroxozincate(II) ion $[Zn(OH)_4]^{2-}$ is prepared by mixing an aqueous alkaline compound solution with an aqueous zinc compound solution at a temperature of room temperature (25° C.) or lower.

<7> Star-shaped zinc oxide particles obtained by a method which includes: heating a solution containing tetrahydroxozincate(II) ion $[Zn(OH)_4]^{2-}$, and diluting the solution containing tetrahydroxozincate(II) ion $[Zn(OH)_4]^{2-}$ with a solvent in the course of reaction so that the concentration of zinc ion ($Zn^{2+}$) after the dilution is adjusted to 0.008 M or lower, wherein microparticles having a particle diameter of 1 nm to 100 nm are accumulated and grown in a branched manner, the microparticles being accumulated so that crystallographic orientations thereof are aligned in a same direction, and wherein the star-shaped zinc oxide particles have an average particle diameter of 1 μm to 3 μm.

DETAILED DESCRIPTION OF THE INVENTION (Method for Producing Star-Shaped Zinc Oxide Particles)

A method of the present invention for producing star-shaped zinc oxide particles includes a heating step and a diluting step; and, if necessary, further includes other steps.

The heating step may be performed prior to or subsequent to the diluting step, or the heating and diluting steps may be performed at the same time.

<Heating Step>

The heating step is a step of heating an solution containing tetrahydroxozincate(II) ion $[Zn(OH)_4]^{2-}$.

—Tetrahydroxozincate(II) ion $[Zn(OH)_4]^{2-}$-Containing Solution—

The tetrahydroxozincate(II) ion $[Zn(OH)_4]^{2-}$-containing solution preferably contains zinc ion ($Zn^{2+}$) and hydroxide ion ($OH^-$) and has a pH of 12.5 to 14.0. When the pH is lower than 12.5, the production yield of the star-shaped zinc oxide particles may decrease. Whereas when the pH exceeds 14.0, the precipitation may not occur since zinc oxide has a high solubility in such pH region.

The pH is a value which is measured at 25° C. using a pH meter.

The tetrahydroxozincate(II) ion $[Zn(OH)_4]^{2-}$-containing solution used may be, for example, a mixed solution of an aqueous alkaline compound solution and aqueous zinc compound solution.

The alkaline compound is not particularly limited and may be appropriately selected depending on the purpose. Examples thereof include alkali metal hydroxides such as sodium hydroxide and potassium hydroxide; alkali metal carbonates such as sodium carbonate and potassium carbonate; ammonium compounds such as sodium acetate, ammonia gas, aqueous ammonia and ammonium hydroxide; alkylamines such as ethylamine, propylamine, butylamine and ethylenediamine; alkanolamines such as monoethanolamine, diethanolamine, triethanolamine, N,N-dimethylethanolamine, monopropanolamine, dipropanolamine and tripropanolamine. These may be used individually or in combination. Of these, sodium hydroxide is particularly preferred.

The concentration of the alkaline compound contained in the aqueous alkaline compound solution is not particularly limited and may be appropriately determined depending on the purpose.

The zinc compound is not particularly limited and may be appropriately selected depending on the purpose. Examples thereof include zinc hydroxide, zinc sulfate, zinc nitrate, zinc chloride and zinc acetate, with zinc sulfate being particularly preferred.

The concentration of the zinc compound contained in the aqueous zinc compound solution is not particularly limited and may be appropriately determined depending on the purpose.

The aqueous alkaline compound solution and the aqueous zinc compound solution are mixed with each other, and the resultant mixture is stirred if necessary. As a result, the reaction proceeds to form tetrahydroxozincate(II) ion $[Zn(OH)_4]^{2-}$ as an intermediate.

Preferably, the aqueous alkaline compound solution and the aqueous zinc compound solution are mixed with each other at a temperature of room temperature (25° C.) or lower. The aqueous zinc compound solution may be added to the aqueous alkaline compound solution at one time or several times in a divided manner. Through the above procedure, a transparent solution containing tetrahydroxozincate(II) ion $[Zn(OH)_4]^{2-}$ is prepared.

The temperature of room temperature or lower is preferably 0° C. to 20° C.

The stirring can be performed using a commonly used mixing/stirring means; e.g., a stirrer equipped with an impeller.

—Heating—

Next, the tetrahydroxozincate(II) ion $[Zn(OH)_4]^{2-}$-containing solution is heated.

The temperature at which the tetrahydroxozincate(II) ion $[Zn(OH)_4]^{2-}$-containing solution is heated is preferably 40° C. or higher, more preferably 45° C. or higher.

The upper limit of the heating temperature depends on the type of a solvent used and thus does not flatly defined. When water is used as a solvent, it is preferably lower than 100° C., more preferably 90° C. or lower.

When the heating temperature is lower than 40° C., the reaction may proceed slowly. When the heating temperature is 100° C. or higher, the reaction using water as a solvent cannot be performed under atmospheric pressure and thus, a reaction container such as an autoclave must be provided in some cases.

The heating temperature is preferably maintained until completion of reaction.

Also, the heating method is not particularly limited and may be appropriately selected depending on the purpose. For example, preferred is a method in which a tetrahydroxozincate(II) ion $[Zn(OH)_4]^{2-}$-containing solution is added to a solvent which has been heated in advance to a predetermined temperature. When this method is employed, the heating of the tetrahydroxozincate(II) ion $[Zn(OH)_4]^{2-}$-containing solution is performed simultaneously with the diluting thereof by the solvent.

<Diluting Step>

The diluting step is a step of diluting the tetrahydroxozincate(II) ion $[Zn(OH)_4]^{2-}$-containing solution with a solvent in the course of reaction to adjust the concentration of zinc ion ($Zn^{2+}$) to 0.008 M or lower.

—Solvent—

Examples of the solvent include water, methanol, ethanol and isopropyl alcohol, with water being particularly preferred.

The solvent is added to the tetrahydroxozincate(II) ion $[Zn(OH)_4]^{2-}$-containing solution in the course of reaction for dilution. In this manner, when the solvent is added for dilution in the course of reaction, the reaction mixture can be adjusted in pH and concentration of zinc ion, whereby star-shaped zinc oxide particles can be produced.

The timing at which the solvent is added in the course of reaction is not particularly limited, so long as it is added in a period from the time at which the reaction is initiated to the time at which the reaction is completed, and may be appropriately determined depending on the purpose. The solvent may be added before or after heating of the tetrahydroxozincate(II) ion $[Zn(OH)_4]^{2-}$-containing solution, or may be added during heating thereof.

The solvent is added in such an amount that the concentration of zinc ion ($Zn^{2+}$) after dilution is adjusted to 0.008 M or lower, preferably 0.005 M or lower. Notably, the lower limit of the concentration of zinc ion ($Zn^{2+}$) after dilution is not particularly limited and may be appropriately determined depending on the purpose. Theoretically, the concentration of zinc ion ($Zn^{2+}$) after dilution is preferably $10^{-6}$ M or higher. When the concentration of zinc ion ($Zn^{2+}$) after dilution is higher than 0.008 M, the production yield of star-shaped zinc oxide particles may decrease without optimizing the reaction conditions.

When the concentration of zinc ion ($Zn^{2+}$) after dilution is 0.006 M to 0.008 M, not only star-shaped zinc oxide particles but also zinc hydroxide is produced. That is, zinc hydroxide coexists with star-shaped zinc oxide particles, which is disadvantageous. When the concentration of zinc ion ($Zn^{2+}$) after dilution is 0.005 M or lower, only star-shaped zinc oxide particles can be obtained.

The crystal phase of the obtained particles (i.e., whether they are zinc hydroxide, zinc oxide or a mixture thereof) can be identified through, for example, X-ray diffraction.

The method in which the solvent is added (i.e., in which the tetrahydroxozincate(II) ion $[Zn(OH)_4]^{2-}$-containing solution is diluted) is not particularly limited and may be appropriately selected depending on the purpose. In the present invention, the production yield is not easily affected by the rate at which the solvent is added. Thus, the tetrahydroxozincate(II) ion $[Zn(OH)_4]^{2-}$-containing solution may be added to the solvent at one time or several times in a divided manner.

The reaction time depends on, for example, the reaction temperature (heating temperature) and thus cannot be flatly defined. For example, when the reaction temperature is 60° C., it is preferably two hours or longer.

Also, the pH of the solution obtained after completion of reaction is preferably 11 to 13. When the pH is lower than 11, ZnO particles do not appear in a single phase in some cases; whereas when the pH exceeds 13, the production yield of star-shaped ZnO particles may decrease.

The pH is a value which is measured at 25° C. using a pH meter.

In the method of the present invention for producing star-shaped zinc oxide particles, for example, first, an aqueous $ZnSO_4$ solution is mixed at room temperature with a solution of an aqueous NaOH solution in pure water, to thereby prepare a transparent solution.

Next, the thus-prepared transparent solution is added to water (solvent) which has been heated in advance to 60° C., followed by reaction at 60° C. for two hours, to thereby produce star-shaped zinc oxide particles.

The method of the present invention for producing star-shaped zinc oxide particles can efficiently produce star-shaped zinc oxide particles through a simple process without any specific apparatus.

(Star-Shaped Zinc Oxide Particle)

The star-shaped zinc oxide particles of the present invention are produced by the method of the present invention for producing star-shaped zinc oxide particles.

The star-shaped zinc oxide particles of the present invention are formed as follows: microparticles having a particle diameter of 1 nm to 100 nm (preferably 25 nm to 40 nm) are accumulated and grown in a branched manner so as to form star-shaped particles, the microparticles being accumulated so that crystallographic orientations thereof are aligned in a same direction.

As shown in FIGS. 1A to 1D, the star-shaped particles refer to particles in which microparticles having a particle diameter of 1 nm to 100 nm (preferably 25 nm to 40 nm) are accumulated and grown in a branched manner, the microparticles being accumulated so that crystallographic orientations thereof are aligned in a same direction; which each have projections radially extended from their core portions located at substantially center portions in a longitudinal direction; and which each have a star shape as a whole. The number of the projections is at least 6, preferably 6 to 10.

Notably, whether or not the shape of zinc oxide particles produced is star-shaped can be judged through observation under a scanning electron microscope (SEM) and transmission electron microscope (TEM).

The star-shaped zinc oxide particles preferably have an average particle diameter of 1 μm to 3 μm. When the average particle diameter is smaller than 1 μm, the star-shaped zinc oxide particles drastically aggregate with one another. Whereas when the average particle diameter is greater than 3 μm, for example, the reaction time must be made longer in the course of reaction in some cases.

Here, the average particle diameter can be measured as follows. Specifically, the star-shaped particles are observed using, for example, a scanning electron microscope (SEM) and transmission electron microscope (TEM). Then, each particle in the obtained image is measured for particle diameter using, for example, a caliper and an image analyzer.

Specifically, the average particle diameter is obtained by averaging the particle diameters of randomly selected 50 particles. Here, each particle diameter is a length of the longest line of straight lines each of which is drawn so as to connect the tip of one projection (branch) through the center portion of the particle with the tip of another projection (branch) located substantially opposite to that of the one projection (branch) in a state where the star-shaped zinc oxide particles are horizontally placed.

—Applications—

The star-shaped zinc oxide particles of the present invention have a highly uniform light-scattering intensity distribution in all directions of the particles and an excellent ultraviolet ray-shielding effect and thus, can be used in various applications such as white pigments, ultraviolet-ray shielding agents, fillers, adsorbents, photocatalysts, catalysts, ceramics raw materials, conductive agents, piezoelectric materials, gas sensors, electrophotographic photosensitive materials, varistors, phosphors, emitters and electronic devices. Further, the star-shaped zinc oxide particles of the present invention are easily dispersed in water and thus, can be used in, for example, cosmetics, external preparations and resin compositions.

Examples

The present invention will next be described by way of examples, which should not be construed as limiting the present invention thereto.

In the following Examples and Comparative Examples, the pH, average particle diameter and X-ray diffraction (XRD) were measured as follows.

<Measurement of pH>

The pH was measured at 25° C. using a portable pH meter (HM-21P, product of DKK-TOA Corporation).

<Measurement of Average Particle Diameter>

The average particle diameter of particles was measured as follows. Specifically, the particles were photographed under a scanning electron microscope (SEM) and/or transmission electron microscope (TEM). Subsequently, 50 particles randomly selected in the obtained image were measured for size. Then, the obtained 50 values were averaged to give an average particle diameter.

<Measurement of X-Ray Diffraction (XRD)>

The X-ray diffraction (XRD) of the produced particles was measured using "RINT1500" (product of Rigaku Corporation, X-ray source: Cu Kα (wavelength: 1.5418 angstroms)) to identify their crystal phase; i.e., whether they were zinc hydroxide, zinc oxide or a mixture thereof.

Example 1

A 4.0 M aqueous NaOH solution (12.5 mL) was added to pure water (25.0 mL) in a beaker (made of plastic). Subsequently, a 0.2 M aqueous $ZnSO_4$ solution (12.5 mL) was mixed at room temperature (25° C.) with the resultant solution (total amount: 50 mL). The thus-obtained transparent solution is referred to as "solution A." This solution A was found to have a pH of 13.5.

Next, solution A (50 mL) was added to water (450 mL) which had been heated in advance to 60° C. (the heating step and the diluting step), followed by reaction at 60° C. for 2 hours. The solution after reaction was found to have a pH of 12.3. Through the above procedure, particles were obtained.

Notably, during reaction, the stirring conditions (rpm) were selected so that a V-shaped cavity was formed at the center portion of the solution; i.e., the solution is stirred in a good stirring state.

Figure 1A:
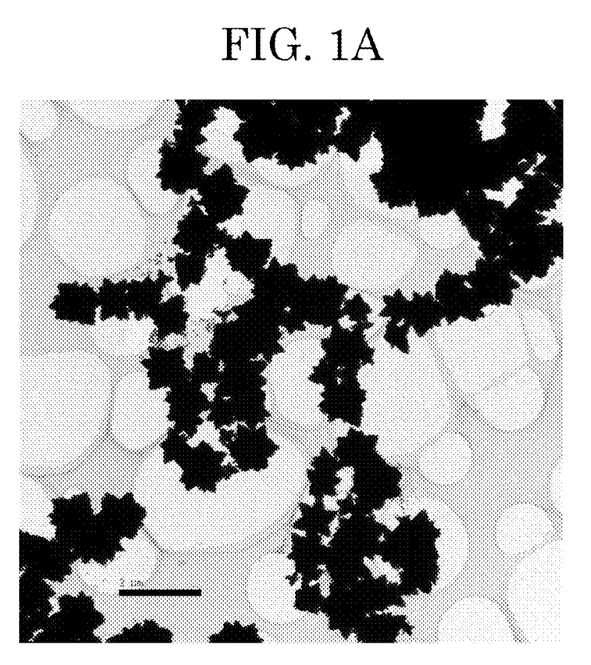
FIG. 1A is a TEM image of star-shaped zinc oxide particles of Example 1.
Figure 1B:
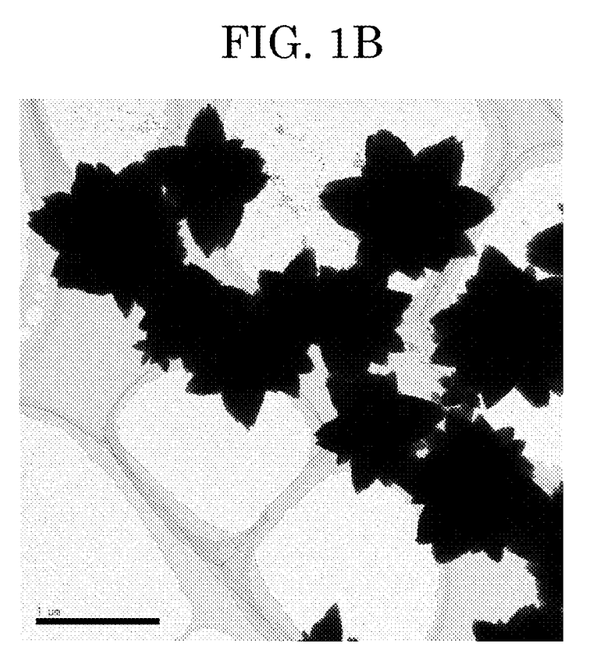
FIG. 1B is an enlarged image of the TEM image of FIG. 1A.
Figure 1C:
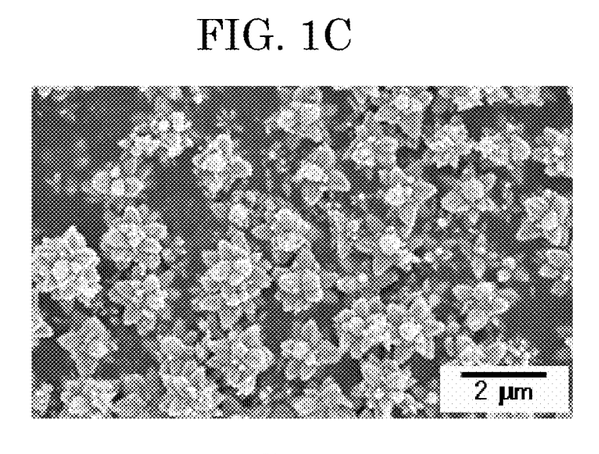
FIG. 1C is an SEM image of star-shaped zinc oxide particles of Example 1.
Figure 1D:
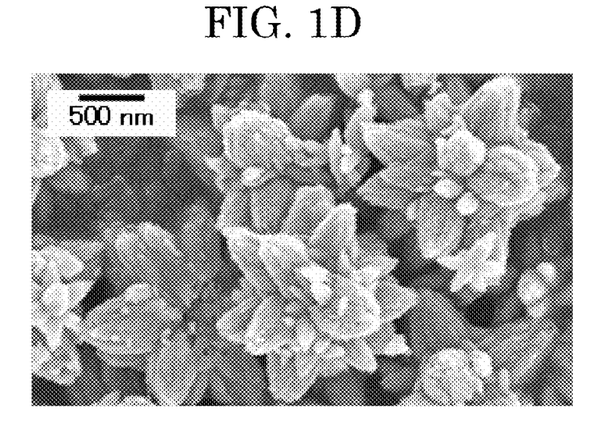
FIG. 1D is an enlarged image of the SEM image of FIG. 1C.

The particles were observed under a transmission electron microscope (TEM). The obtained TEM image is shown in FIGS. 1A and 1B. In addition, the particles were observed under a transmission electron microscope (SEM). The obtained SEM image is shown in FIGS. 1C and 1D. Furthermore, the X-ray diffraction (XRD) of the particles was measured to identify their crystal phase; i.e., whether they were zinc hydroxide, zinc oxide or a mixture thereof. As a result, it was found that star-shaped zinc oxide particles having an average particle diameter of 1.3 μm were produced.

<Measurement of Diffuse Reflectance Spectrum>

Figure 3:
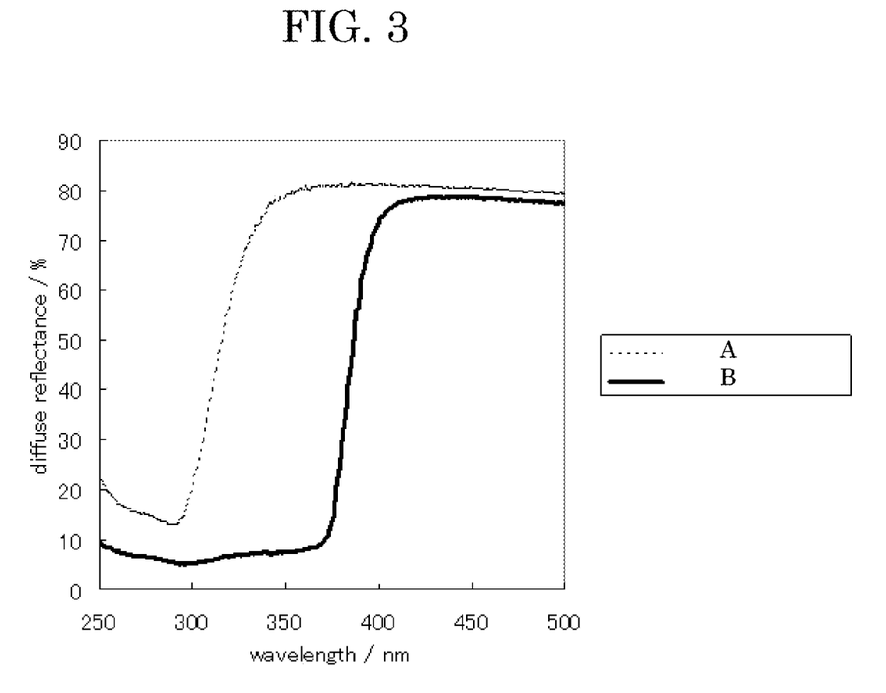
FIG. 3 is a diffuse reflectance spectral chart of a sample which is obtained by applying onto a glass substrate an aqueous dispersion of star-shaped zinc oxide particles of Example 1 and drying, wherein dotted line A is a curve obtained by using a substrate only and solid line B is a curve obtained by using a substrate onto which star-shaped ZnO particles have been applied.

The star-shaped zinc oxide particles of Example 1 were dispersed in water to prepare an aqueous dispersion. The thus-prepared aqueous dispersion was applied onto a glass substrate (product of Matsunami Glass Ind., Ltd., a large-size slide glass (white edge-polished) No. 2 S9112), followed by drying. The obtained sample was measured for diffuse reflectance spectrum (measurement apparatus: HITACHI U-3310 connected to an integrating sphere-equipped apparatus). The results are shown in FIG. 3. The results of FIG. 3 indicate that the star-shaped zinc oxide particles of Example 1 were found to have an excellent ultraviolet ray-absorbability.

Comparative Example 1

The procedure of Example 1 was repeated, except that, in the heating step and the diluting step, solution A (50 mL) was added to water (50 mL) which had been heated in advance to 60° C., to thereby produce particles. The solution after reaction was found to have a pH of 12.7.

Figure 2:
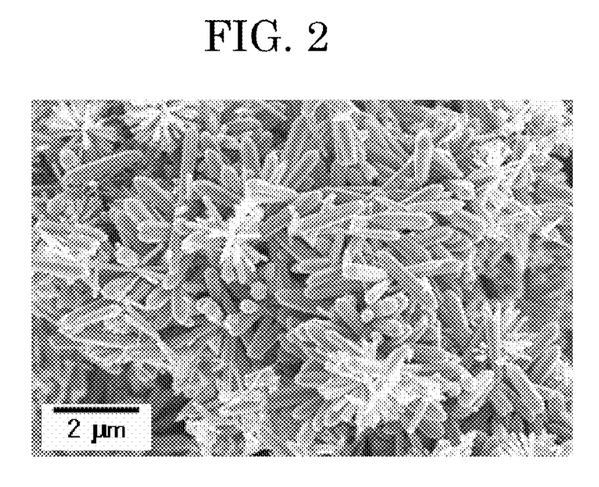
FIG. 2 is an SEM image of zinc oxide particles of Comparative Example 1.

The produced particles were observed under a scanning electron microscope (SEM). The obtained SEM image is shown in FIG. 2. From the image of FIG. 2 and the data of X-ray diffraction (XRD), it was found that rod-like zinc oxide particles were produced.

Comparative Example 2

The procedure of Example 1 was repeated, except that solution A (50 mL) was allowed to react at 60° C. for 2 hours without being diluted by water, to thereby produce particles. The solution after reaction was found to have a pH of 12.8.

The produced particles were observed under a scanning electron microscope (SEM) and measured through X-ray diffraction (XRD), and it was found that rod-like zinc oxide particles were produced.

Example 2

The procedure of Example 1 was repeated, except that a 0.2 M aqueous $ZnSO_4$ solution (12.5 mL) was mixed at a low temperature (5° C.) with a solution of a 4.0 M aqueous NaOH solution (12.5 mL) in pure water (25.0 mL) in a beaker (made of plastic) (total amount: 50 mL), to thereby produce particles.

The particles were observed under a transmission electron microscope (TEM) and scanning electron microscope (SEM) and were measured through X-ray diffraction (XRD), and it was found that star-shaped zinc oxide particles having an average particle diameter of 1.2 μm were produced.

Example 3

The procedure of Example 1 was repeated, except that a 0.2 M aqueous $ZnSO_4$ solution (12.5 mL) was mixed at 30° C.—a temperature higher than room temperature (25° C.)—with a solution of a 4.0 M aqueous NaOH solution (12.5 mL) in pure water (25.0 mL) in a beaker (made of plastic) (total amount: 50 mL), to thereby produce particles.

The particles were observed under a transmission electron microscope (TEM) and scanning electron microscope (SEM) and were measured through X-ray diffraction (XRD), and it was found that star-shaped zinc oxide particles having an average particle diameter of 1.6 μm were produced. Notably, the production yield of the star-shaped zinc oxide particles of Example 3 tended to slightly decrease as compared with Examples 1 and 2.

Example 4

The procedure of Example 1 was repeated, except that, in the heating step and the diluting step, solution A (50 mL) was added to water (370 mL) which had been heated in advance to 60° C., to thereby produce particles. The solution after reaction was found to have a pH of 12.85.

Figure 4:
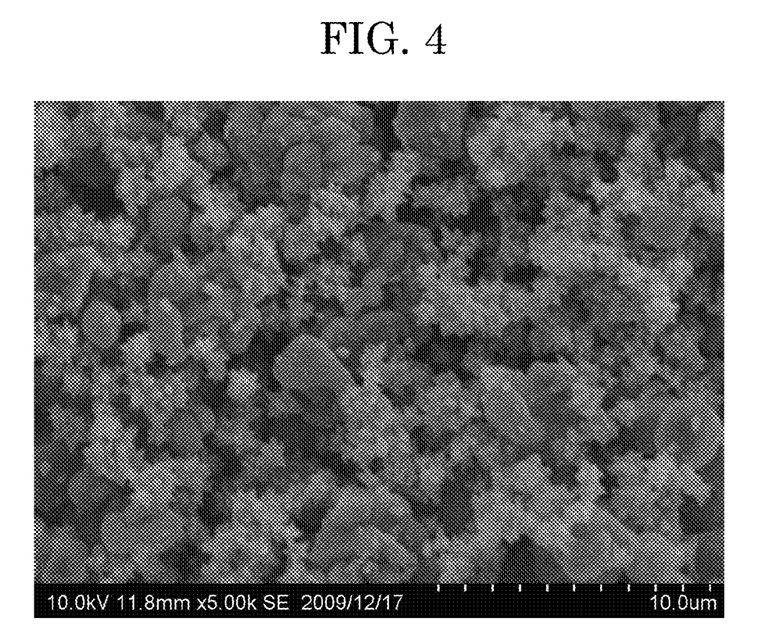
FIG. 4 is an SEM image of particles of Example 4.

The produced particles were observed under a scanning electron microscope (SEM). The obtained SEM image is shown in FIG. 4. From the image of FIG. 4 and the data of X-ray diffraction (XRD), it was found that a mixture of star-shaped zinc oxide particles and octahedral particles (zinc hydroxide) was produced.

Example 5

The procedure of Example 1 was repeated, except that, in the heating step and the diluting step, solution A (50 mL) was added to water (305 mL) which had been heated in advance to 60° C., to thereby produce particles. The solution after reaction was found to have a pH of 12.91.

Figure 5:
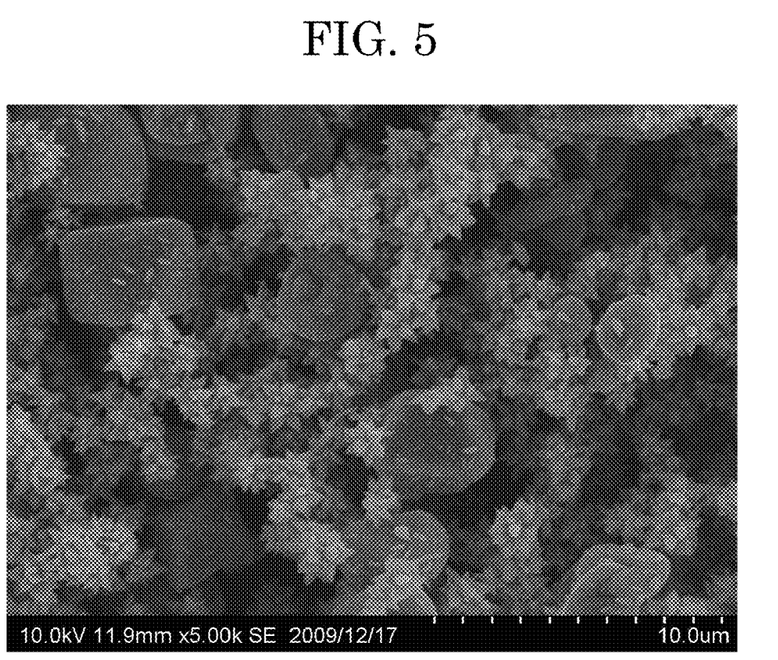
FIG. 5 is an SEM image of particles of Example 5.

The produced particles were observed under a scanning electron microscope (SEM). The obtained SEM image is shown in FIG. 5. From the image of FIG. 5 and the data of X-ray diffraction (XRD), it was found that a mixture of star-shaped zinc oxide particles and octahedral particles (zinc hydroxide) was produced.

Example 6

The procedure of Example 1 was repeated, except that, in the heating step and the diluting step, solution A (50 mL) was added to water (262 mL) which had been heated in advance to 60° C., to thereby produce particles. The solution after reaction was found to have a pH of 12.94.

Figure 6:
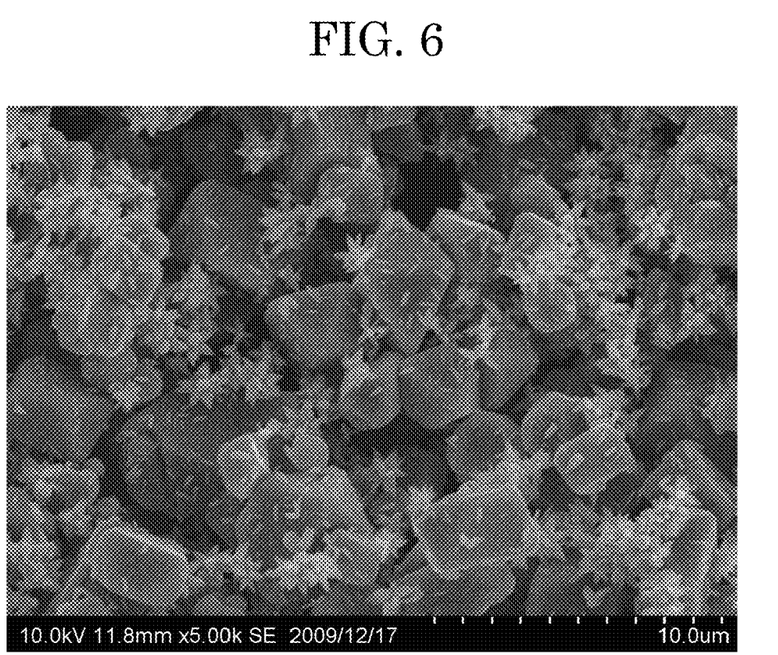
FIG. 6 is an SEM image of particles of Example 6.

The produced particles were observed under a scanning electron microscope (SEM). The obtained SEM image is shown in FIG. 6. From the image of FIG. 6 and the data of X-ray diffraction (XRD), it was found that a mixture of star-shaped zinc particles and octahedral particles (zinc hydroxide) was produced.

Comparative Example 3

The procedure of Example 1 was repeated, except that, in the heating step and the diluting step, solution A (50 mL) was added to water (228 mL) which had been heated in advance to 60° C., to thereby produce particles. The solution after reaction was found to have a pH of 12.88.

Figure 7:
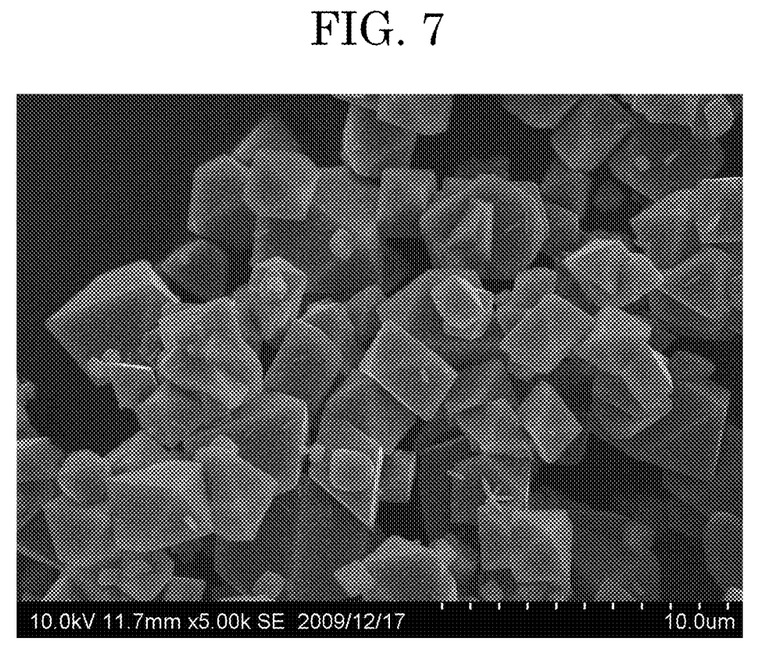
FIG. 7 is an SEM image of particles of Comparative Example 3.

The produced particles were observed under a scanning electron microscope (SEM). The obtained SEM image is shown in FIG. 7. From the image of FIG. 7 and the data of X-ray diffraction (XRD), it was found that octahedral particles (zinc hydroxide) were produced.

Comparative Example 4

The procedure of Example 1 was repeated, except that, in the heating step and the diluting step, solution A (50 mL) was added to water (200 mL) which had been heated in advance to 60° C., to thereby produce particles. The solution after reaction was found to have a pH of 12.92.

Figure 8:
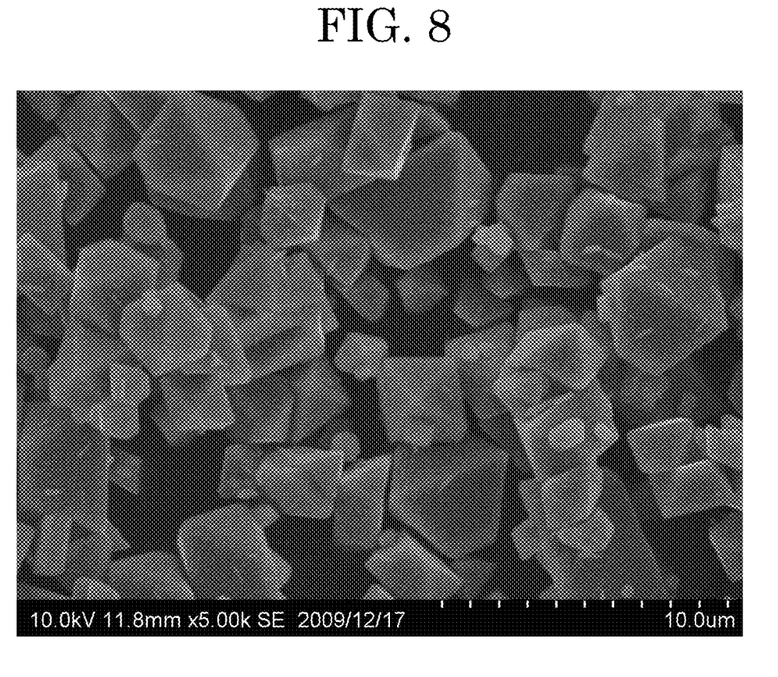
FIG. 8 is an SEM image of particles of Comparative Example 4.

The produced particles were observed under a scanning electron microscope (SEM). The obtained SEM image is shown in FIG. 8. From the image of FIG. 8 and the data of X-ray diffraction (XRD), it was found that octahedral particles (zinc hydroxide) were produced.

The following Tables 1-1 to 1-3 collectively show the conditions of Examples 1 to 6 and Comparative Examples 1 to 4.

TABLE 1-1

|  | Ex. 1 | Comp. Ex. 1 | Comp. Ex. 2 |
|---|---|---|---|
| (1) Starting solution | 0.05M ZnSO$_4$ and 1M NaOH (total 50 mL) | 0.05M ZnSO$_4$ and 1M NaOH (total 50 mL) | 0.05M ZnSO$_4$ and 1M NaOH (total 50 mL) |
| (2) pH of starting solution | 13.5 | 13.5 | 13.5 |
| (3) Temperature of starting solution | 25° C. | 25° C. | 25° C. |
| (4) Diluting solvent | Water, 450 mL | Water, 50 mL | Not used |
| (5) Zinc ion concentration after diluting [Zn$^{2+}$] | 0.005M | 0.025M | 0.05M |
| (6) pH after reaction (60° C., 2 hr) | 12.3 | 12.7 | 12.8 |
| (7) Morphology and composition of final product | Star-shaped (ZnO) | Rod-like (ZnO) | Rod-like (ZnO) |
| (8) Electron microscope image | FIGS. 1A to 1D | FIG. 2 | — |

TABLE 1-2

|  | Ex. 2 | Ex. 3 |
|---|---|---|
| (1) Starting solution | 0.05M ZnSO$_4$ and 1M NaOH (total 50 mL) | 0.05M ZnSO$_4$ and 1M NaOH (total 50 mL) |
| (2) pH of starting solution | 13.5 | 13.5 |
| (3) Temperature of starting solution | 5° C. | 30° C. |
| (4) Diluting solvent | Water, 450 mL | Water, 450 mL |
| (5) Zinc ion concentration after diluting [Zn$^{2+}$] | 0.005M | 0.005M |
| (6) pH after reaction (60° C., 2 hr) | 12.3 | 12.3 |
| (7) Morphology and composition of final product | Star-shaped (ZnO) | Star-shaped (ZnO) |
| (8) Electron microscope image | — | — |

TABLE 1-3

|  | Ex. 4 | Ex. 5 | Ex. 6 | Comp. Ex. 3 | Comp. Ex. 4 |
|---|---|---|---|---|---|
| (1) Starting solution | 0.05M ZnSO$_4$ and 1M NaOH (total 50 mL) | 0.05M ZnSO$_4$ and 1M NaOH (total 50 mL) | 0.05M ZnSO$_4$ and 1M NaOH (total 50 mL) | 0.05M ZnSO$_4$ and 1M NaOH (total 50 mL) | 0.05M ZnSO$_4$ and 1M NaOH (total 50 mL) |
| (2) pH of starting solution | 13.5 | 13.5 | 13.5 | 13.5 | 13.5 |
| (3) Temperature of starting solution | 25° C. | 25° C. | 25° C. | 25° C. | 25° C. |
| (4) Diluting solvent | Water, 370 mL | Water, 305 mL | Water, 262 mL | Water, 228 mL | Water, 200 mL |
| (5) Zinc ion concentration after diluting [Zn$^{2+}$] | 0.006M | 0.007M | 0.008M | 0.009M | 0.01M |
| (6) pH after reaction (60° C., 2 hr) | 12.85 | 12.91 | 12.94 | 12.88 | 12.92 |
| (7) Morphology and composition of final product | Star-shaped (ZnO) and octahedral (zinc hydroxide) | Star-shaped (ZnO) and octahedral (zinc hydroxide) | Star-shaped (ZnO) and octahedral (zinc hydroxide) | Octahedral (zinc hydroxide) | Octahedral (zinc hydroxide) |
| (8) Electron microscope image | FIG. 4 | FIG. 5 | FIG. 6 | FIG. 7 | FIG. 8 |

As is clear from Table 1-3, it was found that only star-shaped zinc oxide particles were produced when the concentration of zinc ion after dilution was 0.005 M or lower, that a mixture of star-shaped zinc oxide particles and zinc hydroxide was produced when the concentration of zinc ion after dilution was 0.006 M to 0.008 M, and that only zinc hydroxide was produced when the concentration of zinc ion after dilution was 0.009 M to 0.01 M.

The star-shaped zinc oxide particles produced by the method of the present invention for producing star-shaped zinc oxide particles have a highly uniform light-scattering intensity distribution in all directions of the particles and an excellent ultraviolet ray-shielding effect and thus, can be used in various applications such as white pigments, ultraviolet-ray shielding agents, fillers, adsorbents, photocatalysts, catalysts, ceramics raw materials, conductive agents, piezoelectric materials, gas sensors, electrophotographic photosensitive materials, varistors, phosphors, emitters and electronic devices. Further, the star-shaped zinc oxide particles of the present invention are easily dispersed in water and thus, can be used in, for example, cosmetics, external preparations and resin compositions.

What is claimed is:

1. A method for producing star-shaped zinc oxide particles via a reaction of a solvent and tetrahydroxozincate (II) ion $[Zn(OH)_4]^{2-}$ to produce zinc oxide, the method comprising:

heating a solution containing tetrahydroxozincate(II) ion $[Zn(OH)_4]^{2-}$, and diluting the solution containing tetrahydroxozincate(II) ion $[Zn(OH)_4]^{2-}$ with a solvent by adding the solvent to the solution in a course of the reaction so that the concentration of zinc ion ($Zn^{2+}$) after the dilution is adjusted to 0.008 M or lower.

2. The method according to claim 1, wherein the diluting is carried out so that the concentration of zinc ion ($Zn^{2+}$) after the dilution is adjusted to 0.005 M or lower.

3. The method according to claim 1, wherein the solution containing tetrahydroxozincate(II) ion $[Zn(OH)_4]^{2-}$ comprises zinc ion ($Zn^{2+}$) and hydroxide ion ($OH^-$) and has a pH of 12.5 to 14.0.

4. The method according to claim 1, wherein the solution obtained after completion of the reaction has a pH of 11 to 13.

5. The method according to claim 1, wherein the heating is carried out at a temperature of 40° C. or higher.

6. The method according to claim 1, wherein the solution containing tetrahydroxozincate(II) ion $[Zn(OH)_4]^{2-}$ is prepared by mixing an aqueous alkaline compound solution with an aqueous zinc compound solution at a temperature of room temperature or lower.

* * * * *